Sept. 1, 1959     I. WOLAR     2,902,245
STEM HANGERS FOR LIGHTING FIXTURES
Filed Feb. 23, 1954
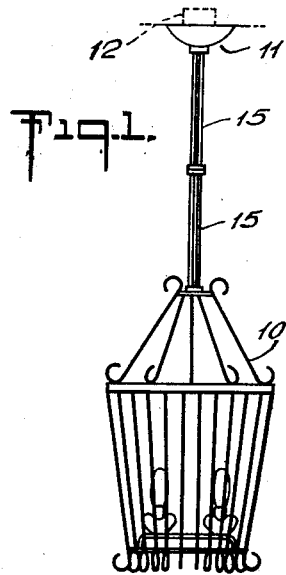
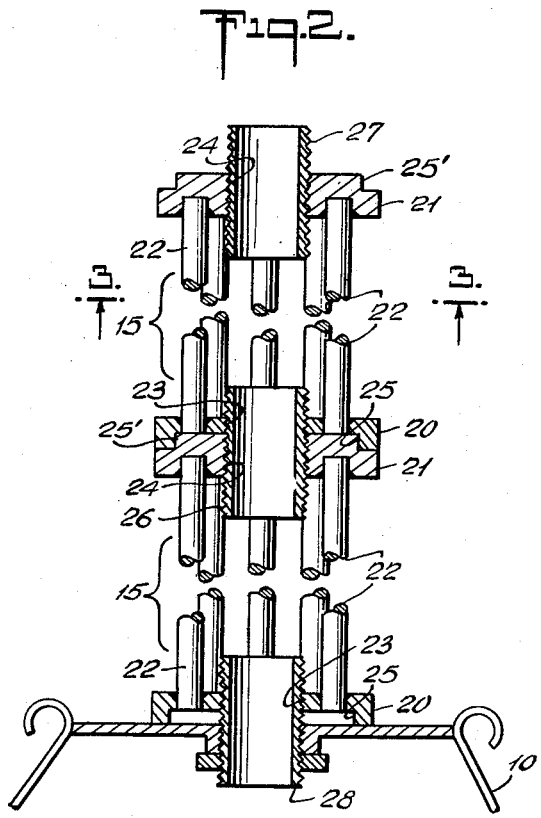
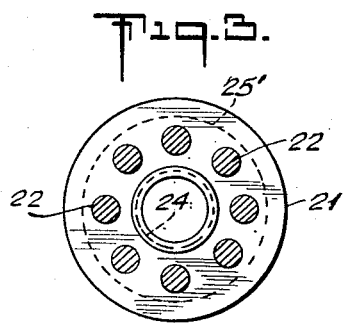
INVENTOR
*ISIDORE WOLAR*
BY
*John M. Cole.*
ATTORNEY

United States Patent Office

2,902,245
Patented Sept. 1, 1959

2,902,245

STEM HANGERS FOR LIGHTING FIXTURES

Isidore Wolar, Mount Vernon, N.Y.

Application February 23, 1954, Serial No. 411,773

3 Claims. (Cl. 248—317)

The present invention relates to stem hangers for lighting fixtures.

Many forms of hanging lighting fixtures, such as chandeliers, hall lights and the like, are constructed largely by the use of small diameter solid metal rods or wires so as to form a light weight cage-like body. These fixtures have come to be known as bird cage type fixtures. When such bird cage type fixtures are hung on conventional hangers with link chain and wiring along the chain, the thin-line artistic motif of the bird cage type fixture is in artistic discord with the conventional chain.

The present invention contemplates stem hangers for lighting fixtures in which the support for the body of the cage type fixture is constructed in a manner to be consistent with the structure of the fixture.

According to the present invention, suspension units of suitable length are constructed from rods or wires similar to those used in the body of the fixture and these rods or wires are permanently secured to disks. The disks forming the ends of the suspension unit are constructed so as to be readily secured to ceiling supports and fixture bodies, or to one another, by the use of threaded tubular coupling members through which the wiring can pass. These units can be made of relatively small diameter so that the wires or rods used in constructing them substantially conceal the wiring in order that its presence is not noticeable.

The accompanying drawings show, for purposes of illustrating the present invention, one embodiment in which the invention may take form, it being understood that the drawings are illustrative of the invention rather than limiting the same.

In the accompanying drawings:

Figure 1 is a side elevational view of a pendent bird cage lighting fixture on the new suspension utilizing the suspension units;

Figure 2 is an enlarged vertical sectional view showing the suspension units secured to a ceiling support, to one another and the fixture body; and Figure 3 is a cross-section on the line 3—3 of Figure 2.

A typical bird cage type of lighting fixture is indicated at 10 in Figure 1. The conventional canopy is indicated at 11 and outlet box at 12. Between the canopy and the fixture body are two suspension units 15, 15.

In Figure 2, two of the suspension units 15, 15 are indicated. The units are alike, each unit having a disk 20 and a disk 21. These disks are counter-bored or drilled through, as indicated, to receive rods 22. The disks and rods are secured together by welding or brazing. These rods are spaced relatively closely together as indicated in Figure 3. The disks are internally threaded as indicated at 23 and 24. This threading is preferably ⅛ or ¼ inch, pipe diameter, running threads. While the disks 20 and 21 may have flat faces so as to fit tightly together, one is preferably counter-bored, as indicated at 25, and the other shouldered, as indicated at 25', so that one telescopes into the other. By making the shoulder 25' slightly shorter than the depth of the recess 24, the two disks contact one another at the periphery so as to provide maximum rigidity when the two disks are held together.

The disks of adjacent units are coupled together by a short nipple, indicated at 26. The upper one may be secured to an outlet box stud or other similar depending tubular member 27, as indicated at the top of Figure 2. The lowermost disk may be secured to a similar threaded member such as the nipple 28 at the bottom of Figure 2.

Wiring indicated by the letter W passes down through the nipples or tubular members and inside the cage structure so as to be substantially and completely obscured by the wires or rods 22. The suspension units herein may be made of suitable length so as to provide suitable variation in the over-all length of the suspension. By selecting suitably long or short lengths of suspension unit, the mounting height of the fixture may be satisfactorily determined.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A sectional stem lighting fixture hanger having at least one section, each section comprising a pair of axially aligned spaced disks each having an axially aligned threaded opening extending therethrough, wireway nipples disposed in said openings, a plurality of rods extending between and fixedly secured to said disks coupling them togther into a unitary section, said rods being spaced outwardly from the axis of the disks to form a narrow elongated structure, and a fixture support, one of said nipples coupling one disk to the fixture support and another of said nipples adapted to engage the fixture to be supported.

2. A stem hanger according to claim 1 wherein one of said disks includes a peripheral step formed in the upper surface thereof and the other of said disks includes a central circular recess therein, whereby one disk of one section will mate with the other disk of another section to form in effect a single disk of composite structure.

3. A sectional stem lighting fixture hanger having at least one section, each section comprising a pair of axially aligned spaced disks each having an axially aligned threaded opening extending therethrough, wire-way nipples disposed in said openings, a plurality of elongated supporting means extending between and fixedly secured to said disks coupling them together into a unitary section, said elongated supporting means being spaced outwardly from the axis of the disks to form a narrow elongated structure, and a fixture support, one of said nipples coupling one disk to the fixture support and another of said nipples adapted to engage the fixture to be supported.

References Cited in the file of this patent

UNITED STATES PATENTS

| D. 125,317 | Sabatini | Feb. 18, 1941 |
| 225,612 | Jones | Mar. 16, 1880 |
| 355,288 | Yale | Dec. 28, 1886 |
| 868,942 | Reid | Oct. 22, 1907 |
| 925,143 | Wakefield | June 15, 1909 |
| 1,585,110 | Recker | May 18, 1926 |
| 2,204,362 | Illian | June 11, 1940 |

FOREIGN PATENTS

| 148,463 | France | Apr. 17, 1882 |